(12) United States Patent
White et al.

(10) Patent No.: US 9,325,960 B2
(45) Date of Patent: Apr. 26, 2016

(54) MAINTENANCE OF THREE DIMENSIONAL STEREOSCOPIC EFFECT THROUGH COMPENSATION FOR PARALLAX SETTING

(75) Inventors: Thomas White, Burlington (CA); Anning Hu, Scarborough (CA)

(73) Assignee: AUTODESK, Inc., San Rafael, CA (US)

( * ) Notice: Subject to any disclaimer, the term of this patent is extended or adjusted under 35 U.S.C. 154(b) by 1020 days.

(21) Appl. No.: 13/291,025

(22) Filed: Nov. 7, 2011

(65) Prior Publication Data

US 2013/0113784 A1 May 9, 2013

(51) Int. Cl.
| | |
|---|---|
| *G06T 15/00* | (2011.01) |
| *G06T 15/10* | (2011.01) |
| *G09G 5/00* | (2006.01) |
| *G06K 9/00* | (2006.01) |
| *G06K 9/36* | (2006.01) |
| *G01C 3/14* | (2006.01) |
| *H04N 13/00* | (2006.01) |
| *G02B 27/22* | (2006.01) |
| *G06T 19/00* | (2011.01) |
| *G06T 7/00* | (2006.01) |
| *G06T 11/60* | (2006.01) |
| *G06T 11/00* | (2006.01) |
| *G06T 15/20* | (2011.01) |
| *H04N 13/02* | (2006.01) |

(52) U.S. Cl.
CPC .......... *H04N 13/0011* (2013.01); *G06T 7/0075* (2013.01); *G06T 11/001* (2013.01); *G06T 11/60* (2013.01); *G06T 15/20* (2013.01); *G06T 19/00* (2013.01); *H04N 13/0014* (2013.01); *H04N 13/0022* (2013.01); *H04N 13/0246* (2013.01); *H04N 13/0278* (2013.01)

(58) Field of Classification Search
CPC ....... G06T 19/00; G06T 15/20; G06T 11/001; G06T 11/60; G06T 7/0075; G06T 3/4038; G06T 7/0065; G06T 7/0042; G06T 3/0093; G09G 2340/0407; G01C 3/16; G02B 27/2214; H04N 13/0239
USPC ................. 345/419–427, 581, 619, 660–671; 382/154, 276, 284, 285, 291, 293; 356/12; 348/42–60; 359/462–477
See application file for complete search history.

(56) References Cited

U.S. PATENT DOCUMENTS 5,175,616 A * 12/1992 Milgram et al. ................ 348/47

* cited by examiner

*Primary Examiner* — Phi Hoang
*Assistant Examiner* — Andrew Shin
(74) *Attorney, Agent, or Firm* — Artegis Law Group, LLP (57) ABSTRACT

Maintaining a three dimensional stereoscopic effect may include determining a distance between a position of a virtual camera and a first center of interest of a three dimensional image, calculating a scaling factor based on the distance, and compensating for a parallax setting associated with a second center of interest within the three dimensional image by applying the scaling factor when generating the three dimensional image to maintain the three dimensional effect.

31 Claims, 4 Drawing Sheets

MAINTENANCE OF THREE DIMENSIONAL STEREOSCOPIC EFFECT THROUGH COMPENSATION FOR PARALLAX SETTING

BACKGROUND OF THE INVENTION

1. Field of the Invention

The invention relates generally to display of a three dimensional scene, and more particularly to maintenance of a three dimensional stereoscopic effect through application of a scaling factor.

2. Description of the Related Art

A conventional three dimensional display system may include a display that presents a three dimensional scene for viewing by a user from the perspective of a virtual camera. The conventional three dimensional display system may maintain the three dimensional effect of the system by using a particular parallax setting that is appropriate for a predetermined scale of objects within the scene, but the introduction of new objects, relative movement between the virtual camera and objects within the scene, or a shift in focus within the scene may result in loss of the three dimensional stereoscopic effect. The loss of the three dimensional stereoscopic effect may make the scene unviewable and may cause a viewer to experience physical discomfort. Accordingly, improvements may be made with respect to the conventional three dimensional display system.

SUMMARY OF THE INVENTION

In an example embodiment, a method of maintaining a three dimensional stereoscopic effect includes determining a distance between a position of a virtual camera and a first center of interest within a three dimensional image, calculating a scaling factor based on the distance, and compensating for a parallax setting associated with a second center of interest within the three dimensional image by applying the scaling factor when generating the three dimensional image to maintain the three dimensional effect.

In another example embodiment, a computer-readable storage medium contains a program which, when executed, performs an operation of a three dimensional stereoscopic effect. The operation includes determining a distance between a position of a virtual camera and a first center of interest within a three dimensional image, calculating a scaling factor based on the distance, and compensating for a parallax setting associated with a second center of interest within the three dimensional image by applying the scaling factor when generating the three dimensional image to maintain the three dimensional effect.

In yet another example embodiment, a system of a three dimensional stereoscopic effect includes a memory, and a processor coupled to the memory. The processor is configured for determining a distance between a position of a virtual camera and a first center of interest within a three dimensional image, calculating a scaling factor based on the distance, and compensating for a parallax setting associated with a second center of interest within the three dimensional image by applying the scaling factor when generating the three dimensional image to maintain the three dimensional effect.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
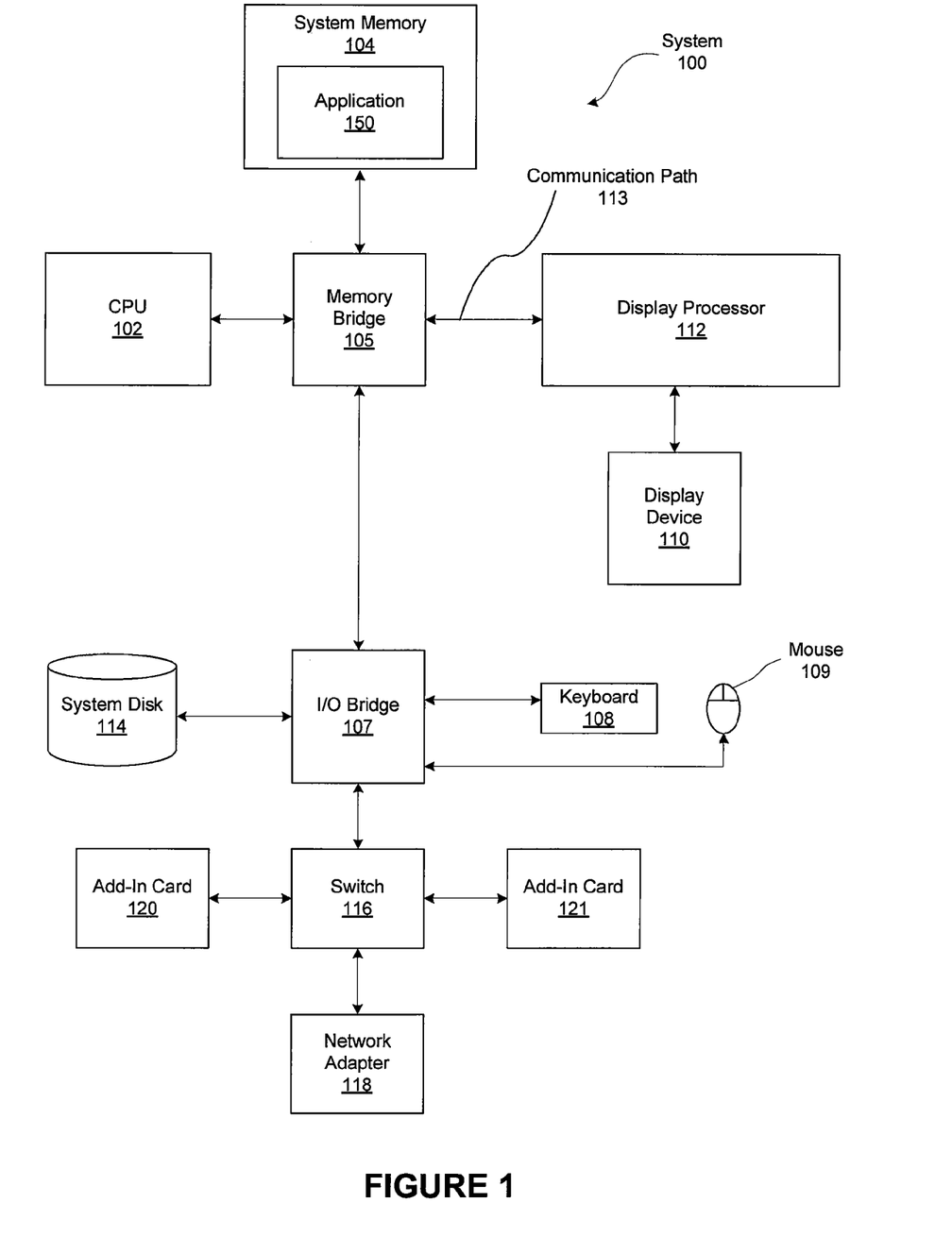
FIG. 1 is a block diagram of a system configured to implement one or more aspects of the present invention.

FIG. 1 is a block diagram of a system 100 configured to implement one or more aspects of the present invention. System 100 may be a computer workstation, personal computer, mobile device, tablet, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives an external input from one or more input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereoscopic image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface (GUI) on display device 110. Application 150 may be configured to generate and modify documents based on input received from a user. For example, application 150 may be a word processing application or an image editing program.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Figure 2:
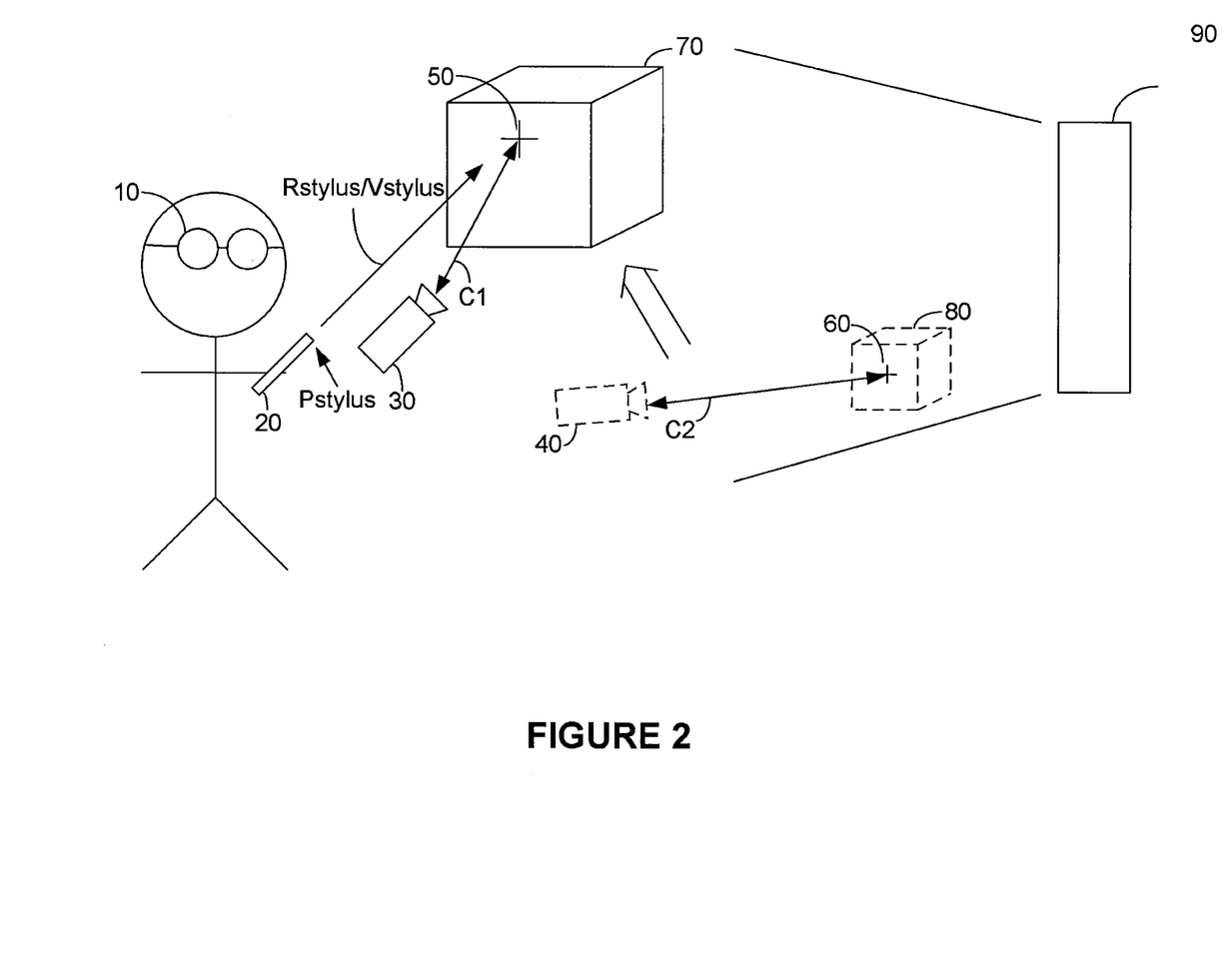
FIG. 2 illustrates maintaining a stereoscopic effect while shifting between two different centers-of-interest.

FIG. 2 illustrates maintaining a stereoscopic effect while shifting between two different centers-of-interest, according to an embodiment of the present invention. FIG. 2 includes a pair of glasses 10, an input device 20, a first position 30 of a virtual camera, a second position 40 of a virtual camera, a first center-of-interest 50, a second center-of-interest 60, a first scene object 70, a second scene object 80, and a display 90. FIG. 2 further includes a stylus ray Rstylus, a first camera ray C1, and a second camera ray C2.

A stereoscopic effect for the second center-of-interest 60 may be generated with an initial parallax setting. More specifically, the difference between images presented to a left and right eye of a viewer may be set to generate a 3D stereoscopic effect for viewing the second scene object 80 associated with the second center-of-interest 60.

As shown in FIG. 2, the first scene object 70 may be introduced, may already exist, or may represent a shift in location of the second scene object 80 to the position of the first scene object 70. The first center-of-interest 50 may be determined by an intersection of Rstylus, a ray projecting from the input device 20, with a surface of the first scene object 70. The first center-of-interest 50 may in another embodiment be determined by a bounding volume center of the first scene object 70 that is intersected by Rstylus. In yet another embodiment, the first center-of-interest 50 may be determined by the intersection of a ray originating from the virtual camera, such as the ray C1. Similarly, either the intersection with the surface of the first scene object 70 or the bounding volume center of the first scene object 70 that is intersected by the ray C1 may be the location of the first center-of-interest 50.

The shift between the second center-of-interest 60 and the first center-of-interest 50 may represent a change in a viewer's focus on different objects. For example, the shift may represent simulating a viewer getting into a car to look at different interior features of the car. In another example, the shift may represent moving the virtual camera through a building or other structures in a 3D scene.

Figure 3:
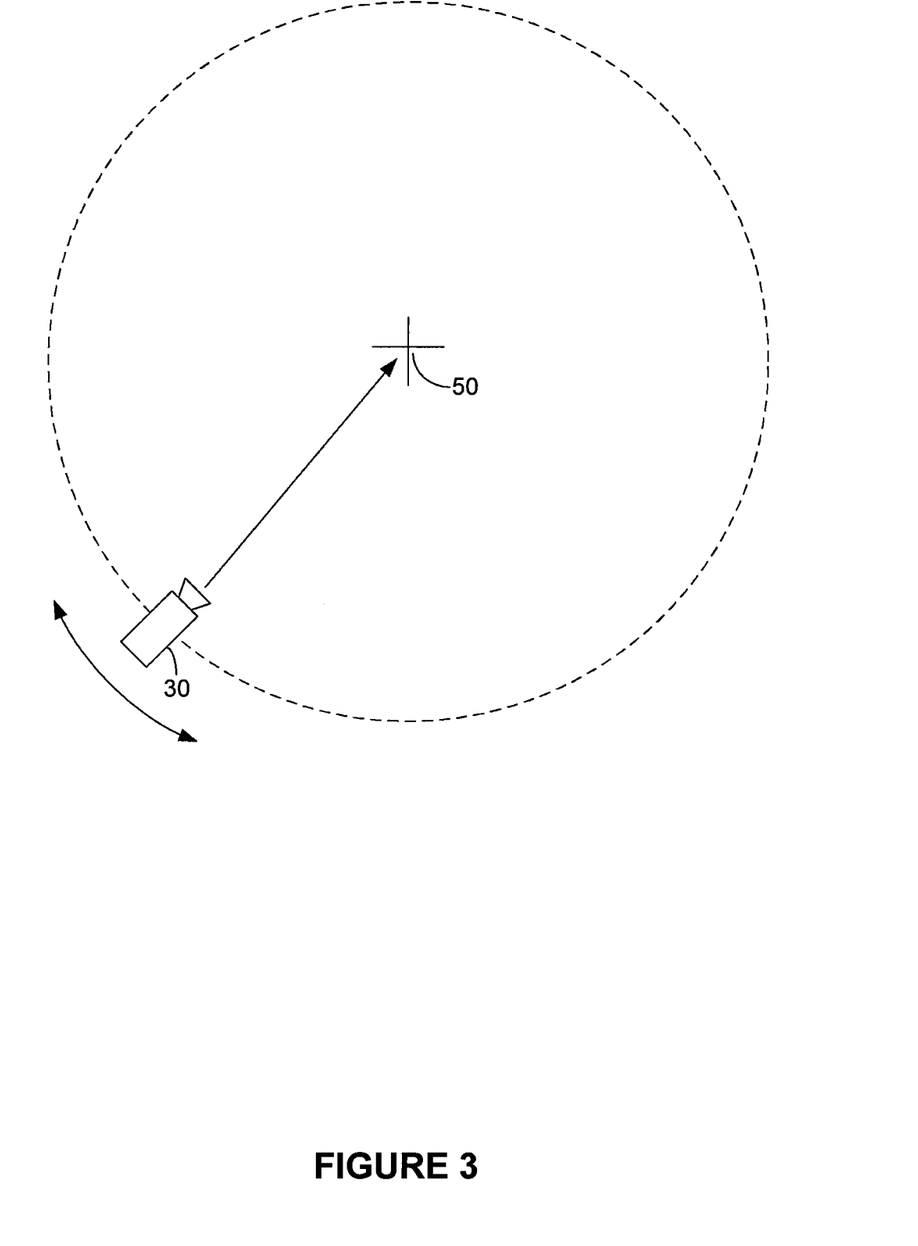
FIG. 3 illustrates rotation of a virtual camera around a center of interest.

The display 90 may be a stereoscopic 3D display that is part of a hardware/software system (not shown) configured to track, in real 3D space relative to the display, the position and the orientation of both a user's head and an input device 20, such as a handheld stylus with at least one button. The position and orientation of the user's head may be determined by a pair of 3D glasses 10 or other eyewear. For example, as shown in FIG. 3, rotation of the user's head may control movement of a virtual camera away from the first position 30 along a curved path around a point, such as the first centerof-interest 50 in the displayed 3D scene. For example, if the user's head and the glasses 10 are rotated to allow the user to look to the user's right side, the virtual camera may be moved to the virtual camera's left side along the curved path around the first center-of-interest 50. Alternatively, if the user's head and the glasses 10 are rotated to allow the user to look to the user's left side, the virtual camera may be moved to the virtual camera's right side along the curved path. The virtual camera may remain oriented such that the ray C1 remains pointed at the first center-of-interest 50 while the virtual camera rotates around the first center-of-interest 50. The display 90 may be a screen placed on a table or other support, and tilted at an angle between 15 and 30 degrees. In other embodiments, the display 90 may be placed at any other position.

To generate a 3D image, the system may use both a projection matrix (which specifies a viewing frustum in world coordinates) and a viewing matrix (which specifies the viewing position and orientation). The viewing matrix is multiplied with one or more model transformation matrices which can change frequently during rendering to produce the model-view matrix. For stereoscopic 3D, there may be separate projection and model-view matrices for each of a left eye and a right eye.

Through a software layer, the system may report both the tracking information of the head and the input device 20 and the necessary transformation matrices required to render a scene in stereoscopic 3D. For each of the left eye and the right eye, the system may calculate and return, in real-time, both a pair of perspective projection matrices (denoted as Pleft and Pright) and a pair of model-view transformation matrices (denoted as Tleft and Tright) to accommodate head tracking. In addition, given a current world model-view matrix (denoted as Mworld), the system may also calculate and return in real-time the position and orientation of the input device 20. If a stylus is used as the input device 20, the system may calculate and return the position of the stylus tip (Pstylus) and the direction (Vstylus) the stylus is pointing. In an embodiment, Rstylus (e.g., a projection) may have a direction (e.g., Vstylus) that corresponds to the orientation of the input device (e.g., the stylus) relative to the three dimensional image. A stylus ray (Rstylus) may originate at Pstylus and have direction Vstylus. As shown in FIG. 2, in an embodiment, Rstylus and Vstylus are both represented by vectors with a single direction. The user may use the stylus to point at an object such as the first scene object 70 or the second scene object 80. Pressing and releasing a stylus button may be used to set the center-of-interest to 1) the pivot, or bounding volume center, of the object, or 2) the intersection of the object surface and the stylus ray Rstylus. This operation permits the stereoscopic focus to be switched between scene elements based on operation of the stylus. Using option 1 may be appropriate when the selected scene object fits within the viewing frustum. Option 2 may be more suited to cases when the scene object is larger than the display, such as when a section of an object is being focused on.

For example, a scene may be comprised of multiple cars. When the camera is sufficiently zoomed out, all of the cars are visible. Option 1 may be used to switch the focus between cars. Option 2 may be appropriate when the user zooms the camera in on one of the cars, or on a headlight or side mirror of a car in the scene. The system may automatically determine whether option 1 or 2 is appropriate.

In an embodiment, the center-of-interest may be automatically set to the intersection of a camera viewing ray (e.g., C1, C2). This may permit the stereoscopic effect to be maintained on the surface of objects at the center of the display 90 as the scene is changed to represent moving a position of a virtual camera. For example, the system may be used to represent navigation of a virtual camera through an interior of a car or building. As the scene is changed to represent rotation or translation of the virtual camera within the 3D environment, the distance between the virtual camera and a surface of a virtual object at the center of the display 90 may be used to automatically adjust the stereoscopic effect of the 3D scene.

The system may display the scene, including the 3D stereoscopic effect, at 1:1 scale in the scene world coordinate space. By default, a unit in the scene world coordinate space may be rendered as 1 inch in real 3D space. However, the 1:1 scale may not be what is desired. Assuming that the scene coordinate space has been scaled in inches, for objects that do not fit within the scene at their actual scale, the stereoscopic effect may be lost due to large negative and/or positive parallax, and the resulting viewing experience may be uncomfortable.

Parallax in the context of 3D stereoscopic graphics generally refers to the differences between the images for the left and right eyes. At the screen surface, there is zero parallax and little difference between the left and right eye images. Negative parallax may be used to create the impression that an object is in front of the display 90, and positive parallax may be used to create the impression that an object appears behind the display 90.

Although some parallax may result in the impression of a three dimensional object, if the degree of parallax is too great, such as when the right and left eye images are too different, then the stereoscopic effect and perception that an image is three dimensional may be broken. Objects at zero parallax may appear to be in focus. The greater the degree of negative or positive parallax away from zero parallax, the more out of focus an object or scene may appear to be. For a three dimensional image generated by the system, an object may remain stereoscopic but be uncomfortable to look at. In contrast, in the real world, a user would normally refocus on an object that they look at.

In an embodiment, the system may use a scaling matrix to automatically adjust the 3D stereoscopic effect to maintain a three dimensional stereoscopic viewing effect independent of the scale of the scene objects. The stereoscopic effect may be dynamically focused on the first center-of-interest 50, which may correspond to a current center-of-interest, taking into account a position E of a virtual camera (e.g., the first position 30 or the second position 40). A global scaling transformation matrix (S) may be inserted into the model-view matrix multiplication chain.

The scene may be changed under various circumstances, such as when a new object is introduced to the scene, when the center-of-interest moves from the second center-of-interest 60 to the first center-of-interest 50, when the position E changes, or during 3D navigation or animation of the scene. When the scene is changed, the global scaling transformation matrix (S) may be recomputed according to the following equations to adjust the stereoscopic effect.

The distance d between the position E and the center-of-interest may be determined according to:

$$d = \|COI - E\| \qquad \text{Eq. (1)}$$

A scaling factor s may be determined as the inverse of d multiplied by a constant C according to:

$$s = \frac{1}{Cd} \qquad \text{Eq. (2)}$$

C may be a constant between 2.0 and 2.2, but other values outside this range may be used to generate s.

S may be a standard uniform scaling matrix of factor s according to:

$$S = \begin{bmatrix} s & 0 & 0 & 0 \\ 0 & s & 0 & 0 \\ 0 & 0 & s & 0 \\ 0 & 0 & 0 & 1 \end{bmatrix} \quad \text{Eq. (3)}$$

Head tracking may be improved when the center-of-interest is positioned at the physical center of the display 90. A stylus that is used as the input device 20 may be operated to set the center-of-interest, and the system may then perform an animated transition to move the center-of-interest to the physical center of the display 90.

In order to generate the 3D scene, the camera may be defined as (E,COI,U), where U is the up vector, and the world model-view matrix, Mworld, may be calculated using the function lookat(S*E, S*COI, UP). The camera eye and center-of-interest are scaled to compensate for the global scaling of the viewing matrix.

The function lookat(eye,center,up) may be defined as (matrices are column-major):
let F=center−eye
let f=F/‖F‖
let up'=up/‖up‖
let s=f×up'
let u=s×f
let M=(s[0] s[1] s[2] 0 u[0] u[1] u[2] 0 −f[0] −f[1] −f[2] 0 0 0 0 1)
let T=(1 0 0 −eye[0] 0 1 0 −eye[1] 0 0 1 −eye[2] 0 0 0 1)
return M*T In this way, the world model-view matrix, Mworld, may be determined. From the pair of model-view transformation matrices (e.g., Tleft and Tright), which are used to accommodate head tracking, the viewing matrix for the left eye, Pleft, may be calculated as Mworld*S*Tleft. The viewing matrix for the right eye, Pright, may be calculated as Mworld*S*Tright.

Figure 4:
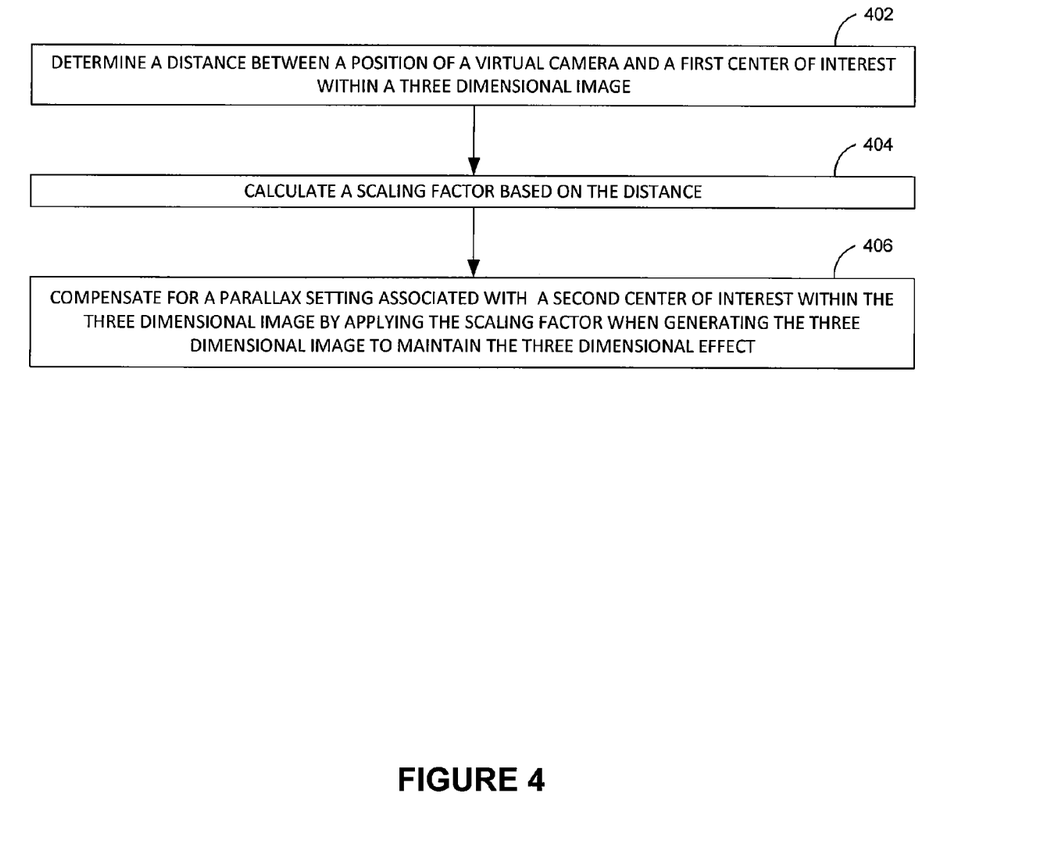
FIG. 4 illustrates an example process of maintaining a three dimensional stereoscopic effect through application of a scaling factor.

FIG. 4 illustrates an example process of maintaining a three dimensional stereoscopic effect through application of a scaling factor. In operation 402, a distance between a position of a virtual camera and the first center-of-interest 50 within a three dimensional image is determined. The position of the virtual camera may correspond to the first position 30, and the distance d may be determined in accordance with Equation (1) based on the position E and the first center-of-interest 50. The distance d may be determined using a processor, such as, without limitation, the CPU 102 or the Display Processor 112 of FIG. 1.

In operation 404, a scaling factor s is calculated based on the distance. The scaling factor s may be determined according to Equation (2) using the CPU 102 or the Display Processor 112.

In operation 406, a parallax setting (e.g., a degree of difference between left and right eye images) associated with the second center of interest 60 is compensated by applying the scaling factor s when generating the three dimensional image to maintain the three dimensional stereoscopic effect. The parallax setting may be compensated using a global transformation matrix (S) that incorporates the scaling factor s. The global transformation matrix (S) may be inserted into the model view matrix multiplication chain. In this way, inappropriate parallax (or the degree of difference between left and right eye images) for the current center of interest may be compensated for to maintain a comfortable stereoscopic effect and to maintain the illusion of a three dimensional scene. Use of the global transformation matrix (S) changes the scale of the entire virtual world, making it bigger or smaller, to maintain the stereoscopic 3D effect.

The scaling factor may be proportional to the inverse of the distance. The stereoscopic effect may be dynamically adjusted in real time in accordance with the scaling factor when one or both of the position of the virtual camera and the center of interest changes. In other embodiments, the stereoscopic effect may be adjusted based on a fixed frequency, a change in a parameter other than the position of the virtual camera or the center of interest, or an external input.

In an example scenario, the center-of-interest may be changed from the second center-of-interest 60 to the first center-of-interest 50. The parallax setting may be independent from the scale of the scene, and the parallax setting may be inappropriate for maintaining the stereoscopic effect whether the parallax setting is held constant or is changed.

Given a system originally designed for a fixed scale and a predetermined parallax setting, shifting the center-of-interest to a new, a moved, or a scaled object may result in loss of the stereoscopic effect. Using the scaling factor to modify the image may maintain the stereoscopic effect to compensate for an inappropriate predetermined parallax setting based on the fixed scale.

The position of the virtual camera associated with the three dimensional image may be based on a viewer position relative to a device displaying the three dimensional image. For example, as shown in FIG. 3, rotation of the user's head may cause rotation of the virtual camera around a point within the scene. The viewer position may be identified based on at least one of a location and orientation of a pair of viewer glasses relative to a display device of the three dimensional image.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method of maintaining a three dimensional stereoscopic effect, the method comprising:
   determining a distance between a position of a virtual camera and a first center of interest within a three dimensional image;
   calculating a scaling factor s based on the distance; and compensating for a parallax setting associated with a second center of interest within the three dimensional image by applying the scaling factor when generating the three dimensional image to maintain the three dimensional stereoscopic effect, wherein applying the scaling factor comprises applying a global transformation matrix S that is based on the scaling factor, wherein the transformation matrix is expressed as:

$$S = \begin{bmatrix} s & 0 & 0 & 0 \\ 0 & s & 0 & 0 \\ 0 & 0 & s & 0 \\ 0 & 0 & 0 & 1 \end{bmatrix}.$$

2. The method of claim 1, wherein the scaling factor is proportional to the inverse of the distance.

3. The method of claim 1, wherein the compensating for a parallax setting further comprises:
in response to detecting a change in at least one of the position of the virtual camera and the first center of interest, dynamically adjusting the three dimensional stereoscopic effect in real time in accordance with the scaling factor.

4. The method of claim 1, wherein the position of the virtual camera is based on a viewer position relative to a device displaying the three dimensional image.

5. The method of claim 4, wherein the viewer position is identified based on at least one of a location and orientation of a pair of viewer glasses relative to the device displaying the three dimensional image.

6. The method of claim 1, further comprising:
determining the first center of interest from the intersection of a projection from the position of the virtual camera onto a virtual object in the three dimensional image, the projection having a direction that corresponds to the orientation of the virtual camera relative to the three dimensional image.

7. The method of claim 1, further comprising:
determining the first center of interest at least in part from a location and orientation of an input device relative to a device displaying the three dimensional image.

8. The method of claim 1, further comprising:
determining the first center of interest from the intersection of a projection from an input device and a surface of a virtual object in the three dimensional image, the projection having a direction that corresponds to the orientation of the input device relative to the three dimensional image.

9. The method of claim 1, further comprising:
determining the first center of interest from a predetermined location of a virtual object in the three dimensional image that is intersected by a projection from an input device, the projection having a direction that corresponds to the orientation of the input device relative to the three dimensional image.

10. A non-transitory computer-readable storage medium comprising instructions for maintaining a three dimensional stereoscopic effect, which when executed by a processor, cause the processor to:
determine a distance between a position of a virtual camera and a first center of interest within a three dimensional image;
calculate a scaling factor s based on the distance; and
compensate for a parallax setting associated with a second center of interest within the three dimensional image by applying the scaling factor when generating the three dimensional image to maintain the three dimensional stereoscopic effect, wherein applying the scaling factor comprises applying a global transformation matrix S that is based on the scaling factor, wherein the transformation matrix is expressed as:

$$S = \begin{bmatrix} s & 0 & 0 & 0 \\ 0 & s & 0 & 0 \\ 0 & 0 & s & 0 \\ 0 & 0 & 0 & 1 \end{bmatrix}.$$

11. The computer-readable storage medium of claim 10, wherein the scaling factor is proportional to the inverse of the distance.

12. The computer-readable storage medium of claim 10, further comprising instructions, which when executed by the processor, cause the processor to:
in response to detecting a change in at least one of the position of the virtual camera and the first center of interest, dynamically adjust the three dimensional stereoscopic effect in real time in accordance with the scaling factor.

13. The computer-readable storage medium of claim 10, wherein the position of the virtual camera is based on a viewer position relative to a device displaying the three dimensional image.

14. The computer-readable storage medium of claim 13, wherein the viewer position is identified based on at least one of a location and orientation of a pair of viewer glasses relative to a device displaying the three dimensional image.

15. The computer-readable storage medium of claim 10, further comprising instructions, which when executed by the processor, cause the processor to:
determine the first center of interest from the intersection of a projection from the position of the virtual camera onto a virtual object in the three dimensional image, the projection having a direction that corresponds to the orientation of the virtual camera relative to the three dimensional image.

16. The computer-readable storage medium of claim 10, further comprising instructions, which when executed by the processor, cause the processor to:
determine the first center of interest at least in part from a location and orientation of an input device relative to a device displaying the three dimensional image.

17. The computer-readable storage medium of claim 10, further comprising instructions, which when executed by the processor, cause the processor to:
determine the first center of interest from the intersection of a projection from an input device and a surface of a virtual object in the three dimensional image, the projection having a direction that corresponds to the orientation of the input device relative to the three dimensional image.

18. The computer-readable storage medium of claim 10, further comprising instructions, which when executed by the processor, cause the processor to:
determine the first center of interest from a predetermined location of a virtual object in the three dimensional image that is intersected by a projection from an input device, the projection having a direction that corresponds to the orientation of the input device relative to the three dimensional image.

19. The computer-readable storage medium of claim 10, wherein applying the scaling factor further comprises inserting the global transformation matrix into a model view matrix multiplication chain.

20. A system configured to maintain a three dimensional stereoscopic effect, the system comprising:
   a memory; and
   a processor coupled to the memory, the processor being configured for:
      determining a distance between a position of a virtual camera and a first center of interest within a three dimensional image;
      calculating a scaling factor s based on the distance; and
      compensating for a parallax setting associated with a second center of interest within the three dimensional image by applying the scaling factor when generating the three dimensional image to maintain the three dimensional stereoscopic effect,
   wherein applying the scaling factor comprises applying a global transformation matrix S that is based on the scaling factor, wherein the transformation matrix is expressed as:

$$S = \begin{bmatrix} s & 0 & 0 & 0 \\ 0 & s & 0 & 0 \\ 0 & 0 & s & 0 \\ 0 & 0 & 0 & 1 \end{bmatrix}.$$

21. The system of claim 20, wherein the scaling factor is proportional to the inverse of the distance.

22. The system of claim 20, wherein applying the scaling factor further comprises inserting the global transformation matrix into a model view matrix multiplication chain.

23. A method of maintaining a three dimensional stereoscopic effect, the method comprising:
   determining a distance between a position of a virtual camera and a first center of interest within a three dimensional image;
   calculating a scaling factor based on the distance; and
   compensating for a parallax setting associated with a second center of interest within the three dimensional image by applying the scaling factor when generating the three dimensional image to maintain the three dimensional stereoscopic effect,
   wherein the scaling factor is computed as $1/(Cd)$, where d is the distance and C is a constant.

24. The method of claim 23, wherein the compensating for a parallax setting further comprises:
   in response to detecting a change in at least one of the position of the virtual camera and the first center of interest, dynamically adjusting the three dimensional stereoscopic effect in real time in accordance with the scaling factor.

25. The method of claim 23, wherein the constant is between 2.0 and 2.2.

26. A non-transitory computer-readable storage medium comprising instructions for maintaining a three dimensional stereoscopic effect, which when executed by a processor, cause the processor to:
   determine a distance between a position of a virtual camera and a first center of interest within a three dimensional image;
   calculate a scaling factor based on the distance; and
   compensate for a parallax setting associated with a second center of interest within the three dimensional image by applying the scaling factor when generating the three dimensional image to maintain the three dimensional stereoscopic effect,
   wherein the scaling factor is computed as $1/(Cd)$, where d is the distance and C is a constant.

27. The computer-readable storage medium of claim 26, wherein the compensating for a parallax setting further comprises:
   in response to detecting a change in at least one of the position of the virtual camera and the first center of interest, dynamically adjusting the three dimensional stereoscopic effect in real time in accordance with the scaling factor.

28. The computer-readable storage medium of claim 26, wherein the constant is between 2.0 and 2.2.

29. A system configured to maintain a three dimensional stereoscopic effect, the system comprising:
   a memory; and
   a processor coupled to the memory, the processor being configured for:
      determining a distance between a position of a virtual camera and a first center of interest within a three dimensional image;
      calculating a scaling factor based on the distance; and
      compensating for a parallax setting associated with a second center of interest within the three dimensional image by applying the scaling factor when generating the three dimensional image to maintain the three dimensional stereoscopic effect,
   wherein the scaling factor is computed as $1/(Cd)$, where d is the distance and C is a constant.

30. The system of claim 29, wherein the compensating for a parallax setting further comprises:
   in response to detecting a change in at least one of the position of the virtual camera and the first center of interest, dynamically adjusting the three dimensional stereoscopic effect in real time in accordance with the scaling factor.

31. The system of claim 29, wherein the constant is between 2.0 and 2.2.

* * * * *